US012689194B2

(12) United States Patent

Questad et al.

(10) Patent No.: US 12,689,194 B2

(45) Date of Patent: Jul. 21, 2026

(54) RACEWAY ASSEMBLY FOR CABLES

(71) Applicant: The Boeing Company, Arlington, VA (US)

(72) Inventors: Nicholas M. Questad, Shoreline, WA (US); Russell W. Keck, Seattle, WA (US); Derrick Brian Pruitt, Bothell, WA (US); James A. Fullerton, Bothell, WA (US); Nathaniel Verboort, Kirkland, WA (US); Justin T. Leach, Seattle, WA (US); Jayson Patrick Paz De Jesus, Sammamish, WA (US); Matthew Halsan, Spokane, WA (US)

(73) Assignee: THE BOEING COMPANY, Arlington, VA (US)

( * ) Notice: Subject to any disclaimer, the term of this patent is extended or adjusted under 35 U.S.C. 154(b) by 793 days.

(21) Appl. No.: 18/161,035

(22) Filed: Jan. 27, 2023

(65) Prior Publication Data

US 2024/0258782 A1 Aug. 1, 2024

(51) Int. Cl.
*H02G 3/04* (2006.01)
*B64D 11/06* (2006.01)
(Continued)

(52) U.S. Cl.
CPC .......... *H02G 3/0487* (2013.01); *B64D 11/06* (2013.01); *H02G 1/08* (2013.01); *H02G 3/045* (2013.01);
(Continued)

(58) Field of Classification Search
CPC ................ B64D 11/06; B64D 11/0601; B64D 2221/00; H02G 3/283; H02G 3/0487;
(Continued)

(56) References Cited

U.S. PATENT DOCUMENTS

| | | | | |
|---|---|---|---|---|
| 5,235,136 A | * | 8/1993 | Santucci .............. | H02G 3/0437 174/101 |
| 5,731,546 A | * | 3/1998 | Miles ........................ | H04Q 1/13 439/456 |

(Continued)

FOREIGN PATENT DOCUMENTS

| | | | | |
|---|---|---|---|---|
| CN | 109428289 A | 3/2019 | | |
| CN | 113422327 A | * | 9/2021 | ........... H02G 3/0456 |

(Continued)

OTHER PUBLICATIONS

"Extended European Search Report Issued in European Patent Application No. 24154411.3", Mailed Date: Jun. 24, 2024, 9 Pages.

*Primary Examiner* — Cheng Lin

(74) *Attorney, Agent, or Firm* — COATS & BENNETT, PLLC

(57) ABSTRACT

A raceway is provided for containing a cable of an aircraft. The raceway includes an elongate base extending a length between end portions and extending a width between sides. The base is configured to be mounted to a structure of the aircraft. The base includes a guide that extends outwardly (Continued)

from a face of the base. The guide is arranged along the length and width of the base such that the guide is configured to bend a path of the cable along the length of the base.

20 Claims, 6 Drawing Sheets

(51) Int. Cl.

| | | |
|---|---|---|
| *H02G 1/08* | (2006.01) |
| *H02G 3/30* | (2006.01) |
| *H02G 3/32* | (2006.01) |
| *H02G 3/38* | (2006.01) |
| *H02G 11/00* | (2006.01) |

(52) U.S. Cl.
CPC ............... *H02G 3/283* (2013.01); *H02G 3/30* (2013.01); *H02G 3/32* (2013.01); *H02G 11/00* (2013.01); *B64D 11/0601* (2014.12); *B64D 2221/00* (2013.01)

(58) Field of Classification Search
CPC   H02G 1/08; H02G 3/32; H02G 3/045; H02G 1/00; H02G 3/00; H02G 11/00
See application file for complete search history.

(56) References Cited

U.S. PATENT DOCUMENTS

| | | | | |
|---|---|---|---|---|
| 6,498,297 | B2 * | 12/2002 | Samhammer | ........ H02G 3/0487 174/101 |
| 7,760,983 | B2 * | 7/2010 | Jadaud | ..................... H02G 3/32 248/62 |
| 8,042,237 | B2 | 10/2011 | Hart et al. | |
| 8,342,855 | B2 | 1/2013 | Tsirangelos et al. | |
| 8,366,042 | B2 * | 2/2013 | Haselmeier | ........... H02G 3/383 244/119 |
| 10,439,381 | B1 * | 10/2019 | Mohlman | ............ H02G 3/0406 |
| 11,362,494 | B2 * | 6/2022 | Kreiger | ................ H02G 3/0425 |
| 2007/0163798 | A1 * | 7/2007 | Wenzler | ............. B60R 16/0215 174/68.3 |
| 2010/0270191 | A1 * | 10/2010 | Bub | ......................... H02G 3/00 206/320 |
| 2010/0314505 | A1 | 12/2010 | Deimer et al. | |

FOREIGN PATENT DOCUMENTS

| | | | | |
|---|---|---|---|---|
| EP | 2485352 | A1 * | 8/2012 | .............. H02G 3/32 |
| EP | 3435501 | B1 * | 12/2022 | ........... H02G 3/0437 |
| WO | WO-2009136511 | A1 * | 11/2009 | ......... B60R 16/0215 |

* cited by examiner

RACEWAY ASSEMBLY FOR CABLES

BACKGROUND

The seat groups of aircraft (e.g., passenger aircraft, etc.) can be arranged in a variety of configurations and positions to provide different cabin layouts. For example, an aircraft cabin includes different classes (e.g., first class, business class, economy class, etc.) during initial aircraft production. Moreover, and for example, an aircraft cabin is reconfigured to have a different cabin layout, for example during service of the aircraft. As many aircraft seats include electrical power and/or data connections, cables of various different lengths and/or configurations are utilized to accommodate the various different seating configurations and positioning.

SUMMARY

In one aspect, a raceway is provided for containing a cable of an aircraft. The raceway includes an elongate base extending a length between end portions and extending a width between sides. The base is configured to be mounted to a structure of the aircraft. The base includes a guide that extends outwardly from a face of the base. The guide is arranged along the length and width of the base such that the guide is configured to bend a path of the cable along the length of the base.

In another aspect, a raceway assembly is provided for an aircraft cabin. The raceway assembly includes a cable and an elongate base extending a length between end portions and extending a width between sides. The base is configured to be mounted to a structure of the aircraft. The base includes a guide that extends outwardly from a face of the base. The guide is arranged along the length and width of the base such that the guide is configured to bend a path of the cable along the length of the base. The cable is held along the length of the base and the guide is arranged along the length and width of the base such that the path of the cable along the length of the base is bent by the guide.

In another aspect, a method of routing a cable to an aircraft seat mounted to a seat track is provided. The method includes routing the cable along a length of a raceway including bending the cable around a guide of the raceway such that a path of the cable along the length of the raceway includes a bend; and mounting the base to the seat track.

DETAILED DESCRIPTION

Figure 1:
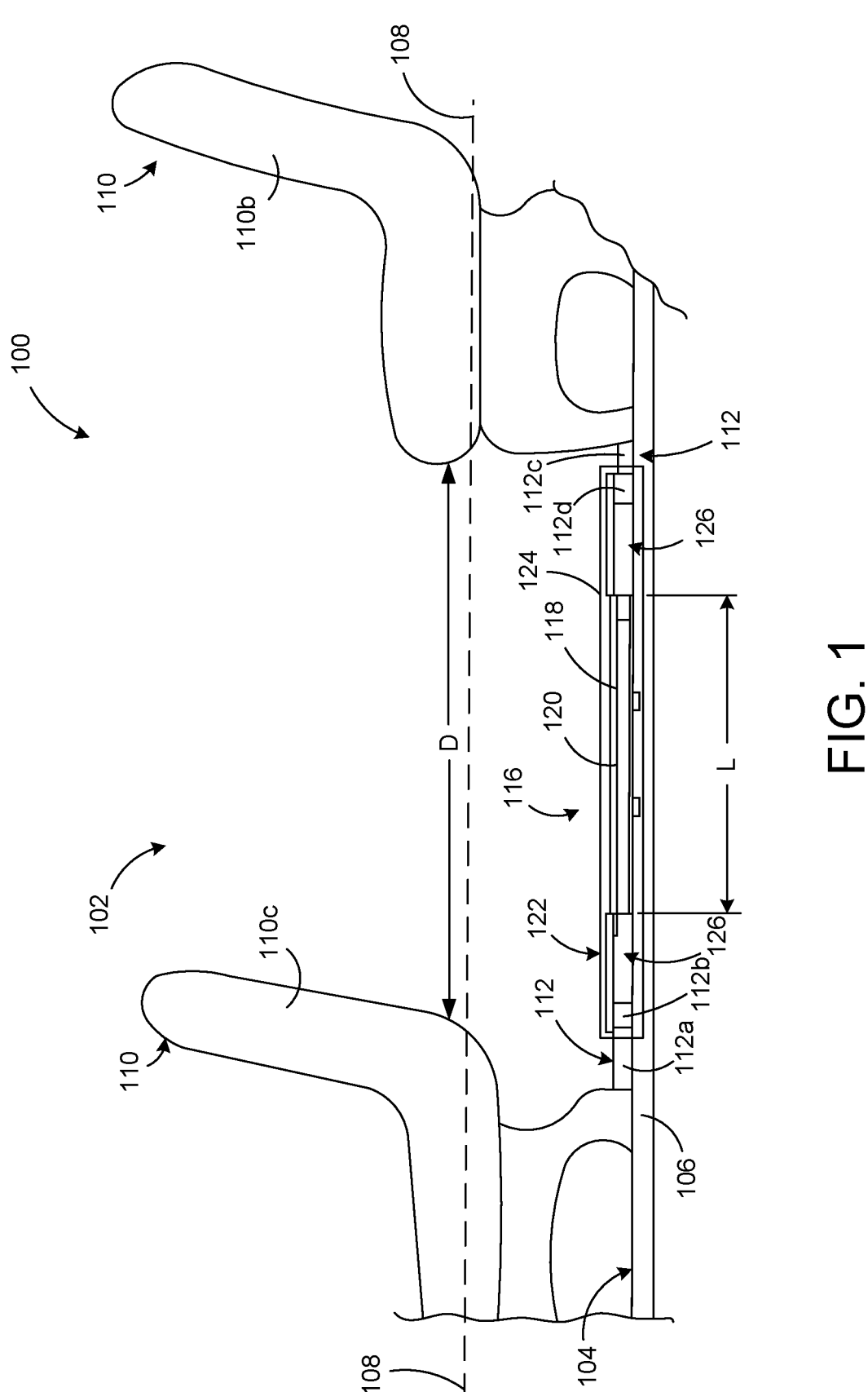
FIG. 1 is a side elevational view illustrating a seating arrangement for an aircraft cabin according to an implementation.

The foregoing summary, as well as the following detailed description of certain implementations will be better understood when read in conjunction with the appended drawings. While various spatial and directional terms, such as "top," "bottom," "upper," "lower," "vertical," and the like are used to describe implementations of the present application, it is understood that such terms are merely used with respect to the orientations shown in the drawings. The orientations can be inverted, rotated, or otherwise changed, such that a top side becomes a bottom side if the structure is flipped 180°, becomes a left side or a right side if the structure is pivoted 90°, and the like.

The seat groups of aircraft (e.g., passenger aircraft, etc.) can be arranged in a variety of configurations and positions to provide different cabin layouts. For example, an aircraft cabin includes different layouts of classes (e.g., first class, business class, economy class, etc.) during initial aircraft production. Moreover, and for example, an aircraft cabin is reconfigured to have a different cabin layout, for example during service of the aircraft. As many aircraft seats include electrical power and/or data connections, cables of various different lengths and/or configurations are utilized to accommodate the various different seating configurations and positioning. For example, cables of various different lengths and/or configurations are used to accommodate different spacing between adjacent seats, commonly referred to as a "seat pitch".

The process for installing cabling is therefore a costly and/or time-consuming task for both initial airplane production and in-service during cabin reconfiguration. For example, as the seat groups can be arranged in various configurations and positions, many cables of various different lengths and configurations are required to accommodate the desired seating configurations and positioning, which is expensive for initial installation, spares, and/or reconfiguration. Additionally, in some examples, when reconfiguring seat groups and/or changing relative seat positions, known cables are inadequate and require new or rebuilt cables to reach the seats in the new configuration and/or position.

Some known seat to seat cable architecture includes connector assemblies that connect two seats and are designed for fixed one inch increment lengths between seats, for example to reduce installation time. However, when an airline operator reconfigures the cabin and the reconfiguration requires a different cable length between seats, the operator obtains new connector assemblies that accommodate the different length. The new connector assemblies can be expensive and are often not readily available, thus resulting in extended airplane downtime during an interior reconfiguration. Moreover, because of the fixed length nature and variable color types in assembly design, known design requires airplane manufactures and airline operations to store inventory of many different part numbers to accommodate initial production installation of seats and/or in-service maintenance support. Additionally, some known airplane models do not utilize this concept and thus require a unique installation for each different seat layout, which is labor intensive and/or time consuming to install for initial airplane production and/or in-service seat reconfigurations. For example, components are recut to accommodate a shortened seat pitch or new components are sourced to accommodate a lengthened seat pitch. Moreover, and for example, cabling going into a seat is readjusted to take in or take out the needed length, which requires extra effort to access the interior of the seat.

Certain implementations provide a raceway for containing a cable of an aircraft. The raceway includes an elongate base extending a length between end portions and extending a width between sides. The base is configured to be mounted to a structure of the aircraft. The base includes a guide that extends outwardly from a face of the base. The guide is arranged along the length and width of the base such that the guide is configured to bend a path of the cable along the length of the base.

Certain implementations provide a raceway that operates in an unconventional manner to provide an adjustable length cable assembly, for example to supply power and/or data to aircraft passenger seats at variable seat pitches. The raceway is configured such that the seating arrangement with the largest pitch will have a cable routing with no bends. An increase in the number of bends will decrease the longitudinal distance the cable can traverse, thereby accounting for (i.e., accommodating) shorter seat pitches. In some examples, the raceway includes a plurality of groups of guides wherein each group is configured to reduce an overall length traversed by the cable by approximately one inch.

Certain implementations reduce or eliminate the need for the procurement, purchase, manufacture, fabrication, installation and/or the like of additional components (e.g., components dedicated to a particular seat pitch dimension, etc.), for example to accommodate a change in seat pitch (e.g., during a seat reconfiguration, etc.). For example, the present disclosure provides a unique adaptable design that enables a single set of parts to be used for a range of different seat pitch installations. Certain implementations provide a seat-to-seat cable architecture that reduces installation time and cost, for example during initial production and/or in retrofit.

FIG. 1 is a side elevational view of a seating arrangement 100 for an aircraft cabin 102 according to an implementation. The aircraft cabin 102 includes a floor 104 and a seat track 106 held by the floor 104 such that the seat track 106 extends along a longitudinal axis 108 of the aircraft cabin 102. The seating arrangement 100 includes adjacent aircraft seats 110 that are each mounted to the seat track 104. The seats 110 are mounted to the seat track 104 such that the seats 110 are aligned one-in-front of the other along the longitudinal axis 108, with the seat 110a being positioned in front of the seat 110b (i.e., the seat 110b is positioned behind the seat 110a). The seats 110a and 110b are spaced apart from each other along the longitudinal axis 108 by a distance D referred to herein as a seat pitch D.

The seats 110 include electrical power and/or data (e.g., optical, electrical, etc.) connections 112 for receiving power and/or data at the seat 110. In the exemplary implementation, the connections 112 include a cable 112a and a connector 112b that terminates an end portion of the cable 112a. Additionally or alternatively, any other arrangement that enables the seat 110 to receive power and/or data is used. In one example, the cable 112a includes a single cable or includes a bundle of two or more cables. Although only one is shown herein, the floor 104 of the aircraft cabin 102 includes any number of seat tracks 106 (e.g., parallel seat tracks for holding laterally offset legs of a seat 110, etc.).

In the exemplary implementation, a raceway assembly 116 is mounted to the seat track 106 between the seats 110a and 110b. The raceway assembly 116 includes a raceway 118 that at least partially contains a cable 120 that interconnects the seats 110a and 110b for supplying the power and/or data to the seats 110. The cable 120 extends a length between end portions 122 and 124 that, in the exemplary implementation, are terminated by connectors 126. The connectors 126 mate with the connectors 112b of the seat connections 112 to distribute power and/or data between the seats 110a and 110b.

Although shown and described herein with respect to at least partially containing a cable that interconnects seats, the raceway assemblies described and/or illustrated herein (e.g., the raceway assembly 116, etc.) are not limited to being used to at least partially contain cables that interconnect seats. Rather, the raceway assemblies described and/or illustrated herein (e.g., the raceway assembly 116, etc.) are used to at least partially contain a cable that interconnects any other component, structure, and/or the like of an aircraft cabin, such as, but not limited to: dividers: furniture structures: walls: lighting components: storage structures, containers, and/or the like: traversing aisles, walkways, lanes, passageways, accesses, and/or the like: buttons (e.g., call buttons, switches, etc.), indicators, signs, and/or the like (e.g., no smoking, stay in seat, etc.); and/or the like. Moreover, the raceway assemblies described and/or illustrated herein (e.g., the raceway assembly 116, etc.) are not limited to being mounted to a seat track. Rather, in some other implementations, the raceway assembly 116 is configured to be mounted to any other structure of an aircraft, such as, but not limited to, a floor, a ceiling, a wall, a side wall, a furniture structure, a divider, a storage container, a storage structure, and/or the like.

As will be described below; the raceway 118 includes guides 130 (not shown in FIG. 1) that are configured to bend a path of the cable 120 along a length of the raceway 118 to thereby reduce an overall length L traversed by the cable 120 (e.g., the linear distance between the connectors 126 when the cable 120 is held by the raceway 118, etc.) and thereby account for (i.e., accommodate) different seat pitches D. For example, the overall length L traversed by the cable 120 can be adjusted to accommodate (e.g., fit, be complementary with, match, correspond to, etc.) a specific seat pitch D dimension by selectively bending the cable 120 around different guides 130, or groups of guides 130, to increase the amount of length of the cable 120 that is contained within the raceway 118.

Figure 2:
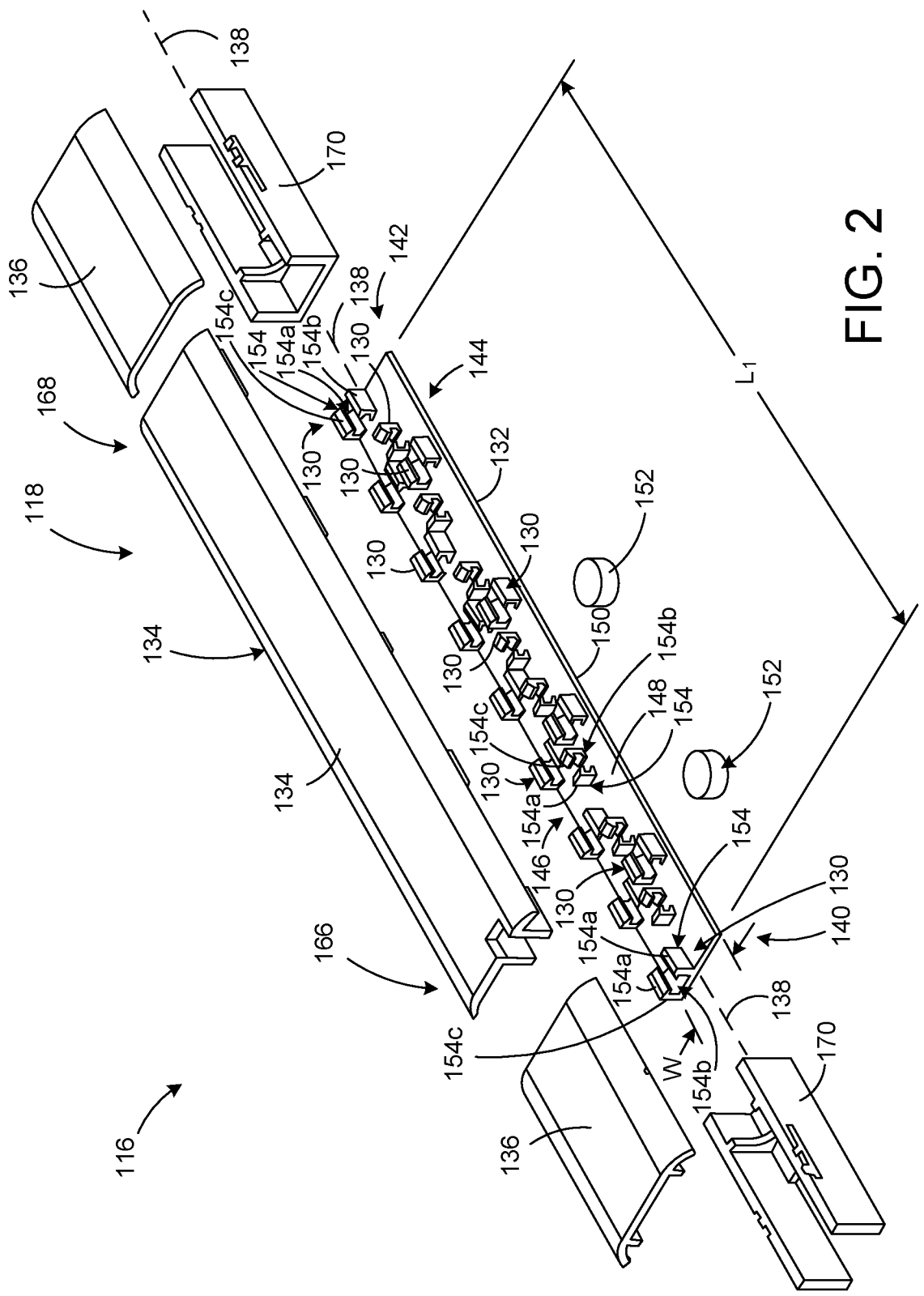
FIG. 2 is an exploded perspective view of a raceway assembly according to an implementation.

Referring now to FIG. 2, the raceway assembly 116 includes the raceway 118, the cable 120 (not shown in FIG. 2) and the connectors 126 (only the housings 170 of the connectors 126 are shown in FIG. 2). The raceway 118 includes an elongate base 132 that includes the guides 130. The raceway 118 optionally includes a cover 134 and/or end covers 136, which will be described below. The base 132 extends a length $L_1$ along a longitudinal axis 138 from an end portion 140 to an opposite end portion 142. In other words, the base 132 extends the length $L_1$ between the end portions 140 and 142. The base 132 extends a width W from a side 144 to an opposite side 146 (i.e., between the sides 144 and 146). The base 132 includes a face 148 and an opposite face 150. The base 132 is configured to be mounted to the seat track 106 (shown in FIG. 1), for example along the face 150 using the exemplary mounting elements 152. Although shown as pegs, the mounting elements 152 additionally or alternatively include any other structure, geometry, means, connector, and/or the like that enables the raceway 118 to be mounted to the seat track 106, which depends on the particular complementary structure of the seat track 106.

The guides 130 extend outwardly from the face 148 of the base 132. The guides 130 are arranged along the length $L_1$ and width W of the base 132 such that the guides 130 are configured to bend the path of the cable 120 along the length of the base 132 (i.e., the path of the cable 120 from the end portion 140 to the end portion 142, and vice versa). In other words, the cable 120 is configured to be bent around one or more of the guides 130 to change (e.g., divert, reroute, etc.) the path of the cable 120 along the length of the base 132 from an approximately linear (e.g., straight, etc.) geometry between the end portions 140 and 142 to a geometry between the end portions 140 and 142 that includes one or more bends. In some examples, one or more guides 130 is configured to generate a bend within the cable 120 having a radius that is equal to or greater than a minimum bend radius, for example to prevent strain damage to the cable 120, etc.

In the exemplary implementation, each guide 130 includes a clip 154 that is configured to hold a corresponding segment of the cable 120 along (e.g., to, over, against, overlapping, etc.) the face 148 of the base 132, for example with a snap-fit, an interference fit, etc. The exemplary implementation of the clip 154 includes opposing towers 154*a* with a channel 154*b* defined between the towers 154*a*. The channel 154*b* is configured to receive the corresponding segment of the cable 120 therein (e.g., therethrough, etc.), for example as shown below in FIGS. 3A-3E. Optional hooks 154*c* of the towers 154*b* provide a snap-fit connection to hold the corresponding segment of the cable 120 along the face 148. The clips 154 are not limited to the towers 154*a*, channel 154*b*, and/or hooks 154*c*, but rather each clip 154 additionally or alternatively includes any other geometry, structure, components, and/or the like that enables the clip 154 to hold the corresponding segment of the cable 120 along the face 148. Moreover, the guides 130 are not limited to including the clips 154. Rather, each guide 130 additionally or alternatively includes any other structure (e.g., a post, a peg, a tower without a hook, etc.) that enables the guide 130 to function as described and/or illustrated herein (e.g., to bend the cable 120, to hold the cable 120 along the face 148, etc.).

Referring now to FIGS. 3A-3E, different combinations of the guides 130 can be used to provide different lengths of the path of the cable 120 along the length $L_1$ of the base 132. In other words, different combinations of the guides 130 can be used to provide different amounts of length of the cable 120 contained within the raceway 118. The raceway assembly 116 thus provides an adjustable length cable 120 that can supply power and/or data to the seat 110 over a variety of different seat pitches D.

Figures 3A, 3B, 3C, 3D, 3E:
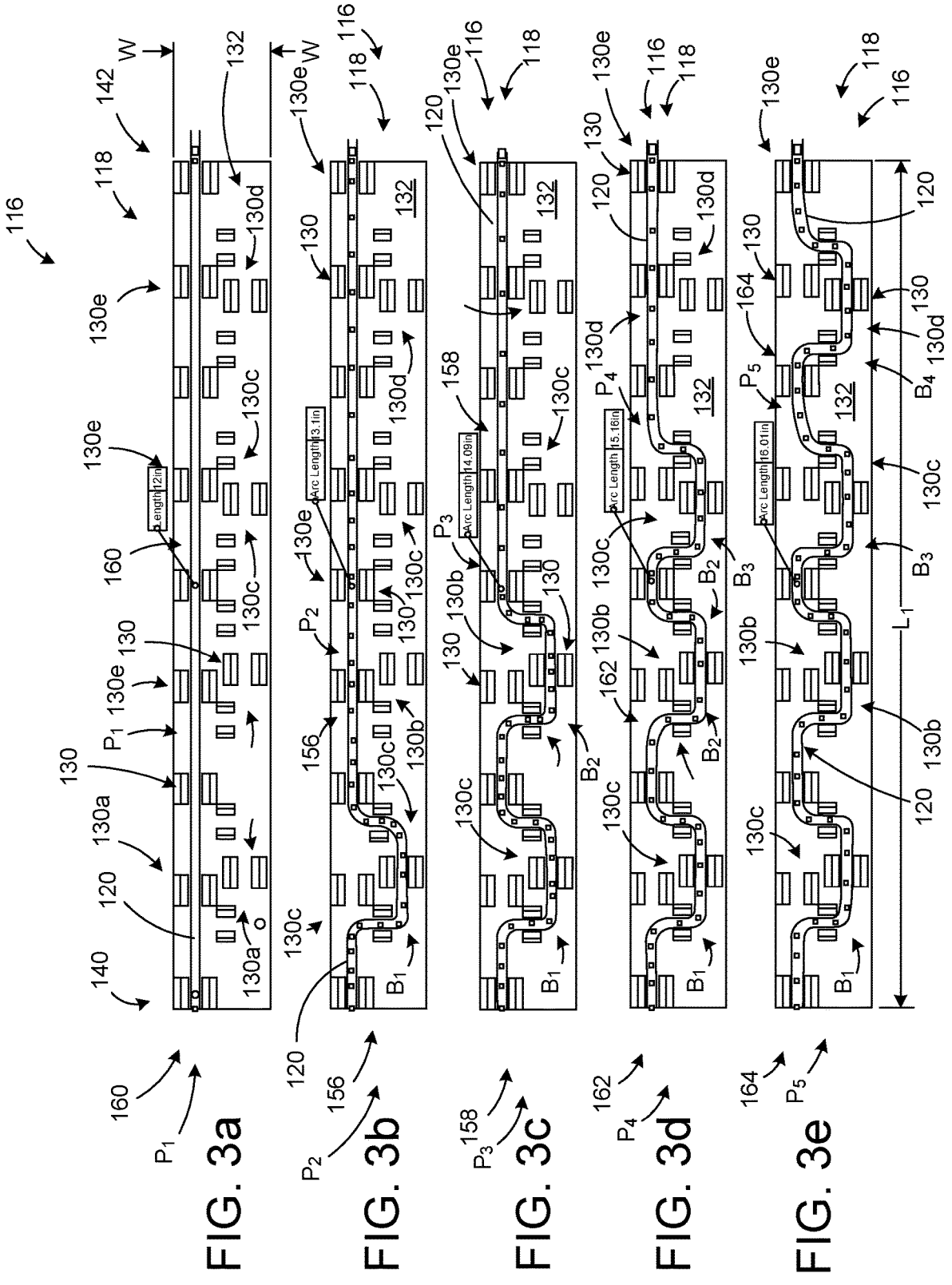
FIGS. 3A-3E illustrate different combinations of guides of a base of the raceway assembly shown in FIG. 2 according to an implementation.

For example, the exemplary implementation of the base 132 includes groups 130*a*. 130*b*, 130*c*, and 130*d* of the guides 130 that are spaced apart along the length $L_1$ of the base 132 such that the guides 130 are configured to generate groups of bends B that are spaced apart along the path of the cable 120, for example the groups $B_1$, $B_2$, $B_3$, and $B_4$ shown in FIGS. 3*b*, 3*c*, 3*d*, and 3*e*. As should be apparent from a comparison of FIGS. 3*a*-3*e*, each group of bends B increases the length of the path of the cable 120 along the length $L_1$ of the base 132. For example, the cable 120 is shown in FIGS. 3*b* and 3*c* as being held by the raceway 118 such in respective geometries 156 and 158. As illustrated through a comparison of FIGS. 3*b* and 3*c*, the path of the cable 120 along the length $L_1$ of the base 132 has a greater length in the geometry 158 as compared to the geometry 156. In one example, each group 130*a*, 130*b*, 130*c*, and 130*d* increases the length of the path of the cable 120 along the length $L_1$ of the base 132 by any amount. In some examples, one or more of the groups 130*a*, 130*b*, 130*c*, and 130*d* increase the length of the path of the cable 120 along the length $L_1$ of the base 132 by approximately one inch. Each of the geometries 156 and 158 are also referred to herein as a "first" and/or a "second" geometry. The guides 130 of each of the groups 130*a-d* are also referred to herein as "first" guides.

Each of the various shaped paths formed by the various groups 130*a*-130*d* of guides 130 includes any geometry. For example, each group 130*a*, 130*b*, 130*c*, and 130*d* is configured to generate any number of bends B that form any shape(s), such as, but not limited to, U-shapes as shown in FIGS. 3*b*-3*e*, W-shapes, V-shapes, S-curves as shown in FIGS. 3*c*-3*e*, loops, crossovers, figure eights, and/or the like. In some examples, one or more of the groups 130*a*-130*d* is configured to bend the path of the cable 120 along the length $L_1$ of the base 132 such that the path includes as segment that is at least one of tortuous, winding, curved, twisting, and/or the like, for example as shown in FIGS. 3*b*-3*e*.

By increasing the length of the path of the cable 120 along the length $L_1$, the bends B increase the amount of length of the cable 120 that is contained within (e.g., the length of) the raceway 118, reduce slack in the cable 120, and reduce the overall length L traversed by the cable 120 when held by the raceway 118. The base 132 is configured to hold the cable 120 in a variety of different geometries that provide a variety of different overall lengths L traversed by the cable 120, which enables the raceway 118 as adjustable to accommodate (e.g., fit, be complementary with, match, correspond to, etc.) a variety of different seat pitches D. In this way, the overall length L traversed by the cable 120 can be selectively adjusted to accommodate a particular seat pitch D dimension, for example during an initial build, during a reconfiguration, etc.

For example, FIG. 3*a* illustrates that the exemplary implementation of the base 132 includes a group 130*e* of the guides 130 that is arranged along the length $L_1$ and width W of the base 132 such that the group 130*e* is configured to provide a path $P_1$ of the cable 120 along the length $L_1$ of the base 132 as approximately linear (e.g., straight, etc.). In other words, the path $P_1$ of the cable 120 along the length $L_1$ of the base 132 has an approximately linear (e.g., straight, etc.) geometry 160 between the end portions 140 and 142. The approximately linear path $P_1$ of the cable 120 provides the longest configuration (i.e., accommodates the greatest seat pitch D dimension) of the raceway assembly 116. Although nine are shown, the group 130*e* includes any number of the guides 130. The geometry 160 is also referred to herein as a "second" geometry. The guides 130 of the group 130*e* are also referred to herein as "second" guides.

FIG. 3*b* illustrates the cable 120 being held by the base 132 in the geometry 156 wherein the cable 120 is bent around the group 130*a* of the guides 130 such that a path $P_2$ of the cable 120 along the length $L_1$ of the base 132 includes the group $B_1$ of bends B. The non-linear path $P_2$ of the cable 120 between the end portions 140 and 142 is longer than the path $P_1$ shown in FIG. 3*a* and therefore is configured to accommodate a smaller seat pitch D dimension as compared to the path $P_1$.

FIG. 3*c* illustrates the cable 120 being held by the base 132 in the geometry 158 wherein the cable 120 is bent around the groups 130*a* and 130*b* of the guides 130 such that a path $P_3$ of the cable 120 along the length $L_1$ of the base 132 includes the group $B_1$ and the group $B_2$ of the bends B. The non-linear path $P_3$ of the cable 120 between the end portions 140 and 142 is longer than the path $P_2$ shown in FIG. 3*b* and therefore is configured to accommodate a smaller seat pitch D dimension as compared to the path $P_2$.

FIG. 3*d* illustrates the cable 120 being held by the base 132 in a geometry 162 wherein the cable 120 is bent around the groups 130*a*, 130*b*, and 130*c* of the guides 130 such that a path $P_4$ of the cable 120 along the length $L_1$ of the base 132 includes the groups $B_1$, $B_2$, and $B_3$ of the bends B. The non-linear path $P_4$ of the cable 120 between the end portions 140 and 142 is longer than the path $P_3$ shown in FIG. 3*c* and therefore is configured to accommodate a smaller seat pitch D dimension as compared to the path $P_3$. The geometry 162 is also referred to herein as a "first" and/or a "second" geometry.

FIG. 3e illustrates the cable 120 being held by the base 132 in a geometry 164 wherein the cable 120 is bent around the groups 130a, 130b, 130c, and 130d of the guides 130 such that a path $P_5$ of the cable 120 along the length $L_1$ of the base 132 includes the groups $B_1$, $B_2$, $B_3$, and $B_4$ of the bends B. The non-linear path $P_5$ of the cable 120 between the end portions 140 and 142 is longer than the path $P_4$ shown in FIG. 3d and therefore is configured to accommodate a smaller seat pitch D dimension as compared to the path $P_4$. The geometry 164 is also referred to herein as a "first" geometry.

In some examples, the geometries 160, 156, 158, 162, and 164 are separated from each other by a standard increment, such as, but not limited to, approximately one inch, approximately two centimeters, the dimension of an increment of the seat track 106, and/or the like. In the exemplary implementation, the geometries 160, 156, 158, 162, and 164 are separated from each other by approximately one inch.

Although three are shown, each of the groups 130a, 130b, 130c, and 130d include any number of the guides 130. Moreover, in some examples, each group 130a, 130b, 130c, and 130d are arranged along the length $L_1$ and width W of the base 132 in any other geometry that enables the raceway 118 to function as described and/or illustrated herein. For example, each group 130a, 130b, 130c, and 130d are arranged along the length $L_1$ and width W of the base 132 in any other geometry that provides any other number of bends B, any additional or alternative shapes of bends B and/or groups of the bends B, any additional or alternative shapes of a path of the cable 120 along the length $L_1$ of the base 132, any number of different overall length L dimensions (despite five being shown), any increment between different overall lengths L, accommodates any size range of different seat pitch D dimensions, and/or the like. Although shown as including a single cable 120, the cable 120, in some examples include a bundle of two or more cables 120.

Figure 4:
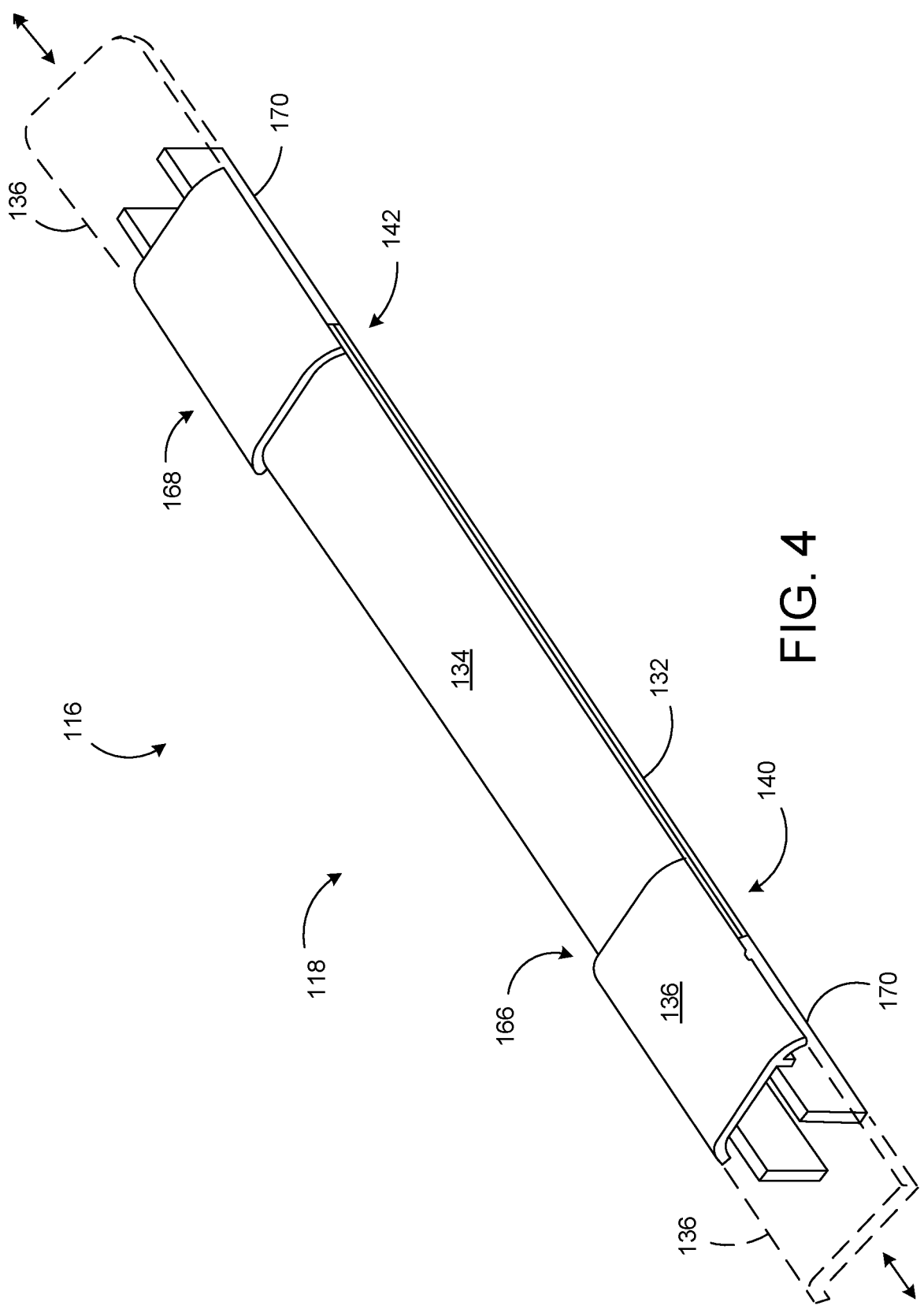
FIG. 4 is a perspective view of the raceway assembly shown in FIG. 2 according to an implementation.

Referring now to FIGS. 2 and 4, the raceway 118 optionally includes the cover 134 and/or the end covers 136. The cover 134 is removably mounted to the base 132 such that the cover 134 extends over the face 148 (not visible in FIG. 4) of the base 132. The cover 134 facilitates containing the cable 120 (not shown in FIG. 2 or 4) within the raceway 118 (e.g., along the base 132) such that the cable 120 is held in place along the face 148 of the base 132 in the selected path geometry. In one example, the cover 134 is be removably mounted to the base 132 using any suitable geometry, structure, means, connector, and/or the like, such as, but not limited to, using a snap-fit connection, an interference fit connection, a latch, a clip, a fastener, a threaded fastener, and/or the like. In some examples, the cover 134 includes a security feature (not shown: e.g., a pinhole button, etc.) to prevent unauthorized removal of the cover 134 (e.g., to prevent passengers from intentionally or unintentionally tampering with the cable 120, etc.).

The end covers 136 are mounted to opposite end portions 166 and 168 of the cover 134 for covering the housings 170 of the connectors 126 (only the housings 170 of the connectors 126 are shown in FIG. 4), which extend adjacent the end portions 140 and 142 of the base 132. The end covers 136 are mounted to the cover 134 such that the end covers 136 are configured to telescope inwardly and outwardly relative to the base 132 and the cover 134, as indicated by the dashed lines in FIG. 4. The telescoping relative motion of the end covers 136 enables the positions of the end covers

136 to be adjusted according to the selected overall length L traversed by the cable 120 (shown in FIG. 1). The end covers 136 are configured to cover any gaps between the end portions 140 and 142 of the base 132 and the connector housings 170. The longer the configuration of the raceway 118, the less amount of overlap between the end covers 136 and the cover 134.

Figure 5:
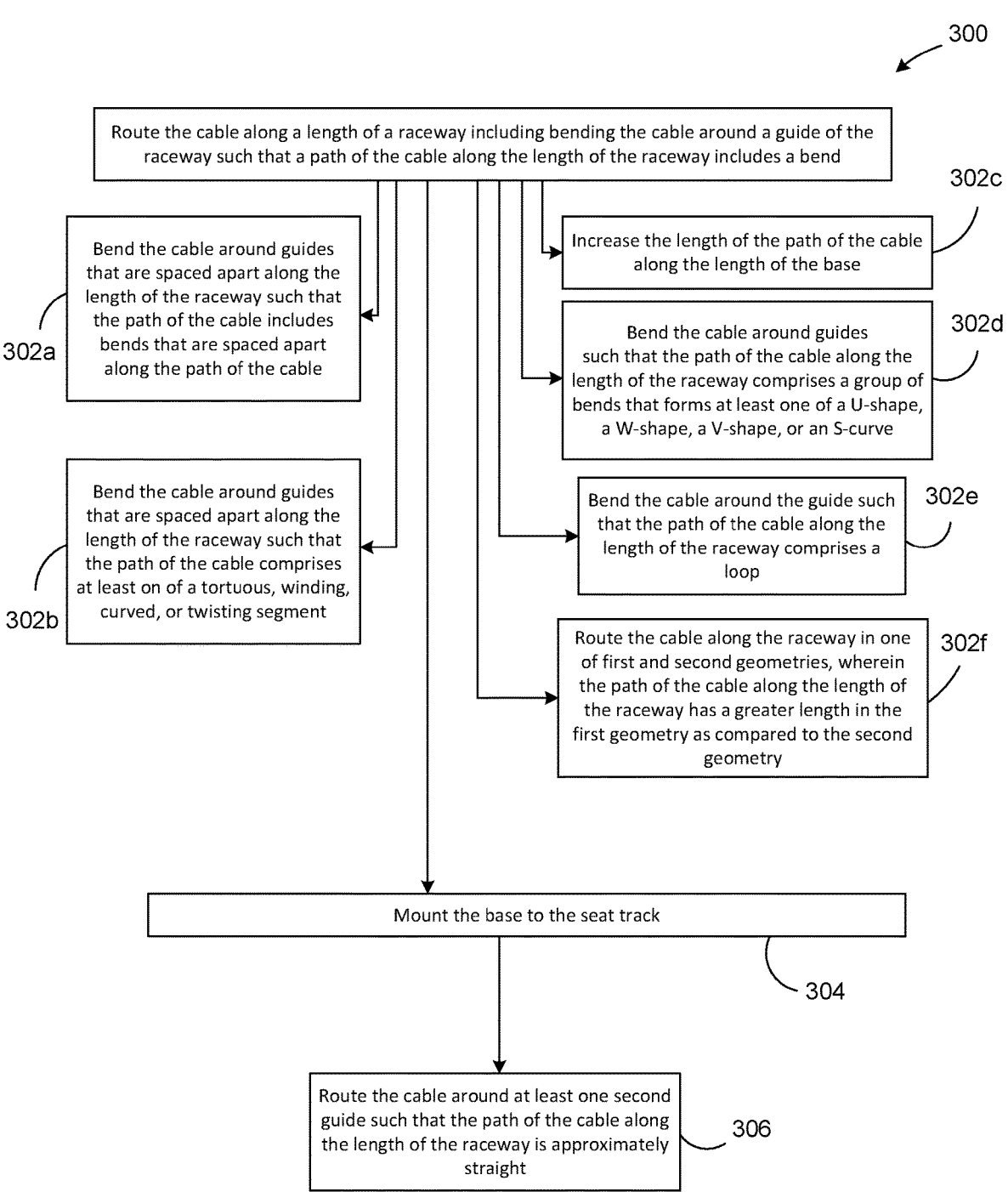
FIG. 5 is a flow chart illustrating a method of routing a cable to an aircraft seat according to an implementation.

FIG. 5 illustrates a method 300 of routing a cable (e.g., the cable 120 shown in FIGS. 1 and 3, etc.) to an aircraft seat (the aircraft seats 110 shown in FIG. 1, etc.) mounted to a seat track (the seat track 106 shown in FIG. 1, etc.). The method 300 includes routing, at 302, the cable along a length of a raceway including bending the cable around a guide of the raceway such that a path of the cable along the length of the raceway includes a bend. At 304, the method 300 includes mounting the base to the seat track.

In some implementations, routing at 302 the cable along the length of the raceway includes bending, at 302a, the cable around guides that are spaced apart along the length of the raceway such that the path of the cable includes bends that are spaced apart along the path of the cable.

Optionally, routing at 302 the cable along the length of the raceway includes bending, at 302b, the cable around guides that are spaced apart along the length of the raceway such that the path of the cable comprises at least one of a tortuous, winding, curved, or twisting segment.

In some implementations, bending at 302 the cable around the guide includes increasing, at 302c, the length of the path of the cable along the length of the base.

In some implementations, routing at 302 the cable along the length of the raceway includes bending, at 302d, the cable around guides such that the path of the cable along the length of the raceway comprises a group of bends that forms at least one of a U-shape, a W-shape, a V-shape, or an S-curve.

Optionally, routing at 302 the cable along the length of the raceway includes bending, at 302e, the cable around the guide such that the path of the cable along the length of the raceway comprises a loop.

Optionally, routing at 302 the cable along the length of the raceway includes routing, at 302f, the cable along the raceway in one of first and second geometries, wherein the path of the cable along the length of the raceway has a greater length in the first geometry as compared to the second geometry.

In some implementations, the guide is a first guide and the method 300 further includes routing, at 306, the cable around at least one second guide such that the path of the cable along the length of the raceway is approximately straight.

Figure 6:
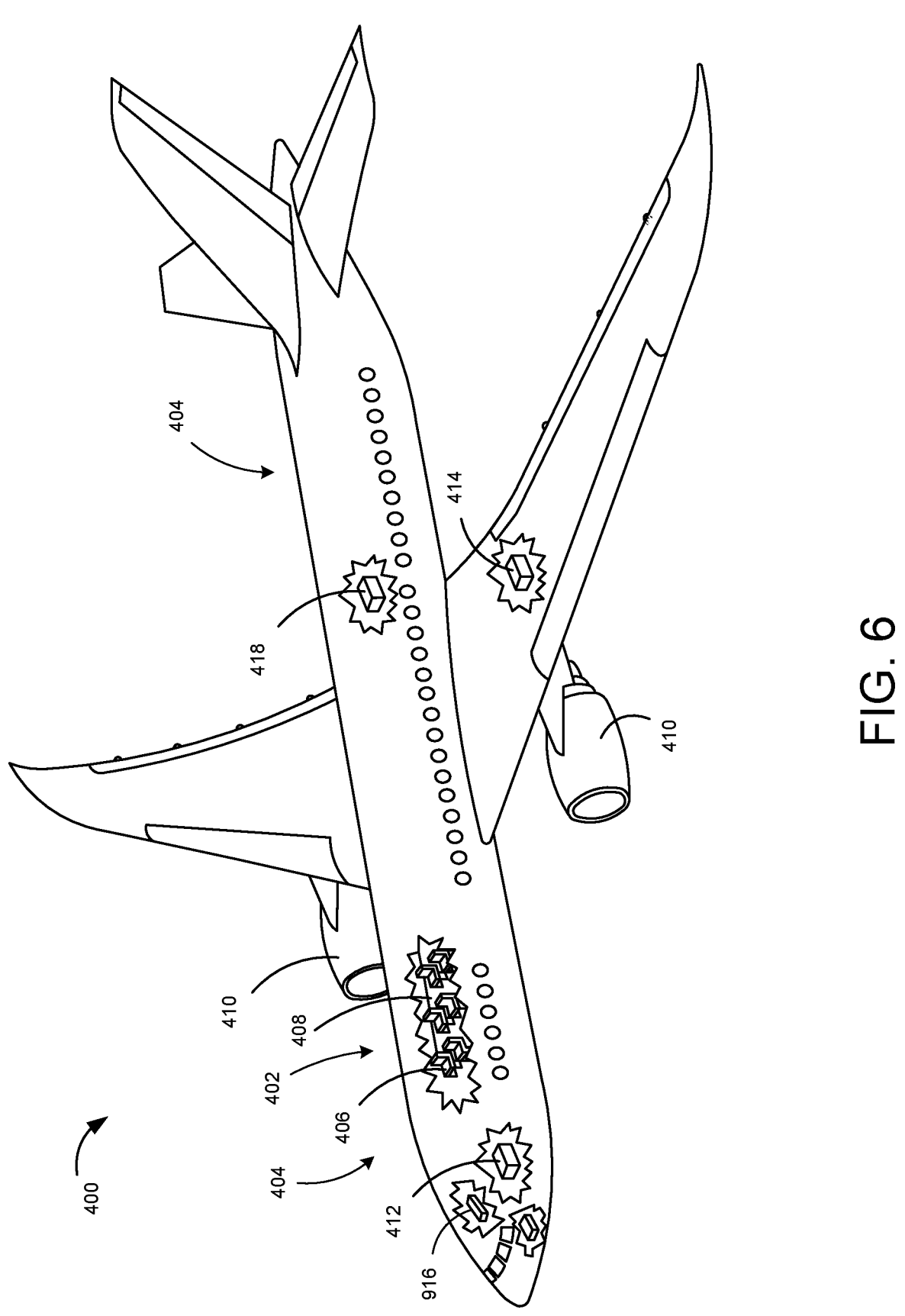
FIG. 6 is a schematic view of an implementation of an aircraft.

Referring now to FIG. 6, examples of the present application are described in the context of an aircraft 400 that includes an airframe 402. The aircraft 400 includes a plurality of high-level systems 404 and an interior 406 that includes a cabin 408. Examples of high-level systems 404 include one or more of a propulsion system 410, an electrical system 412, a hydraulic fluid system 414, a control system 416, and an environmental system 418. Any number of other systems can be included. Although a fixed wing passenger aircraft is shown, the raceways disclosed herein can be used with any other type of aircraft, such as, but not limited to, transport aircraft, military aircraft, rotorcraft (e.g., helicopters, etc.), lighter than air vehicles (e.g., balloons, etc.), and/or the like. Moreover, although an aerospace example is shown, the present application can be applied to other industries, such as, but not limited to, the automotive industry, the marine industry, etc.

The following clauses describe further aspects:

Clause Set A:

A1. A raceway for containing a cable of an aircraft, the raceway comprising:

an elongate base extending a length between end portions and extending a width between sides, the base being configured to be mounted to a structure of the aircraft, the base comprising a guide that extends outwardly from a face of the base, wherein the guide is arranged along the length and width of the base such that the guide is configured to bend a path of the cable along the length of the base.

A2. The raceway of any preceding clause, wherein the guide comprises guides spaced apart along the length of the base such that the guides are configured to generate bends that are spaced apart along the path of the cable.

A3. The raceway of any preceding clause, wherein the guide comprises guides spaced apart along the length of the base such that the guides are configured to bend the path of the cable such that the path comprises at least one of a tortuous, winding, curved, or twisting segment.

A4. The raceway of any preceding clause, wherein the guide comprises groups of guides spaced apart along the length of the base such that each group of guides is configured to generate a corresponding group of bends, each group of bends configured to increase the length of the path of the cable along the length of the base.

A5. The raceway of any preceding clause, wherein the guide comprises a group of guides arranged relative to each other along the length and width of the base such that the group of guides is configured to generate a group of bends that forms at least one of a U-shape, a W-shape, a V-shape, or an S-curve.

A6. The raceway of any preceding clause, wherein the guide is configured to generate a loop along the path of the cable.

A7. The raceway of any preceding clause, wherein the guide comprises guides arranged along the length and width of the base such that the raceway is configured to hold the cable in first and second geometries, wherein the path of the cable along the length of the base has a greater length in the first geometry as compared to the second geometry.

A8. The raceway of any preceding clause, wherein the guide is a first guide, the base comprising at least one second guide that is configured to provide the path of the cable along the length of the base as approximately straight.

A9. The raceway of any preceding clause, wherein the guide comprises opposing towers with a channel defined between the towers, the channel being configured to receive a segment of the cable therein.

A10. The raceway of any preceding clause, wherein the guide comprises a clip configured to hold a segment of the cable along the face of the base.

A11. The raceway of any preceding clause, further comprising a cover mounted to the base such that the cover extends over the face of the base.

A12. The raceway of any preceding clause, further comprising connector housings extending adjacent the end portions of the base.

A13. The raceway of any preceding clause, further comprising end covers configured to telescope inwardly and outwardly relative to the base.

A14. The raceway of any preceding clause, wherein the guide is configured to generate a bend having a radius that is at least one of equal to or greater than a minimum bend radius.

A15. The raceway of any preceding clause, wherein the guide comprises groups of guides spaced apart along the length of the base such that each group of guides is configured to generate a corresponding group of bends, each group of bends configured to increase the length of the path of the cable along the length of the base by approximately one inch.

Clause Set B:

B1. A raceway assembly for an aircraft cabin, the raceway assembly comprising:

a cable; and an elongate base extending a length between end portions and extending a width between sides, the base being configured to be mounted to a structure of the aircraft, the base comprising a guide that extends outwardly from a face of the base, wherein the guide is arranged along the length and width of the base such that the guide is configured to bend a path of the cable along the length of the base.

wherein the cable is held along the length of the base and the guide is arranged along the length and width of the base such that a path of the cable along the length of the base is bent by the guide.

B2. The raceway assembly of any preceding clause, wherein the guide comprises guides spaced apart along the length of the base such that the path of the cable comprises bends that are spaced apart along the path of the cable.

B3. The raceway assembly of any preceding clause, wherein the guide comprises guides spaced apart along the length of the base such that the path of the cable comprises at least one of a tortuous, winding, curved, or twisting segment.

B4. The raceway assembly of any preceding clause, wherein the guide comprises groups of guides spaced apart along the length of the base such that each group of guides is configured to generate a corresponding group of bends along the path of the cable, each group of bends configured to increase the length of the path of the cable along the length of the base.

B5. The raceway assembly of any preceding clause, wherein the guide comprises a group of guides arranged relative to each other along the length and width of the base such that the path of the cable comprises at least one of a U-shape, a W-shape, a V-shape, or an S-curve.

B6. The raceway assembly of any preceding clause, wherein the path of the cable comprises a loop.

B7. The raceway assembly of any preceding clause, wherein the guide comprises guides arranged along the length and width of the base such that the raceway is configured to hold the cable in first and second geometries, wherein the path of the cable along the length of the base has a greater length in the first geometry as compared to the second geometry.

B8. The raceway assembly of any preceding clause, wherein the guide is a first guide, the base comprising at least one second guide that is configured to provide the path of the cable along the length of the base as approximately straight.

B9. The raceway assembly of any preceding clause, wherein the guide comprises opposing towers with a channel defined between the towers, the channel receiving a segment of the cable therein.

B10. The raceway assembly of any preceding clause, wherein the guide comprises a clip that holds a segment of the cable along the face of the base.

B11. The raceway assembly of any preceding clause, further comprising:

a cover mounted to the base such that the cover extends over the face of the base;

connector housings extending adjacent the end portions of the base; and end covers extending over the connector housings and configured to telescope inwardly and outwardly relative to the base.

B12. The raceway assembly of any preceding clause, wherein the guide comprises groups of guides spaced apart along the length of the base such that each group of guides is configured to generate a corresponding group of bends along the path of the cable, each group of bends configured to increase the length of the path of the cable along the length of the base by approximately one inch.

B13. The raceway assembly of any preceding clause, wherein the guide is configured to generate a bend having a radius that is at least one of equal to or greater than a minimum bend radius.

Clause Set C:

C1. An aircraft comprising:

a cabin comprising a seat track and at least one seat mounted to the seat track;

a cable configured to be operatively connected to the seat; and a raceway for containing the cable, the raceway comprising an elongate base extending a length between end portions and extending a width between sides, the base being mounted to the seat track, the base comprising a guide that extends outwardly from a face of the base, wherein the cable is held along the length of the base and the guide is arranged along the length and width of the base such that the guide bends a path of the cable along the length of the base.

Clause Set D:

D1. A method of routing a cable to an aircraft seat mounted to a seat track, the method comprising:

routing the cable along a length of a raceway including bending the cable around a guide of the raceway such that a path of the cable along the length of the raceway includes a bend; and mounting the base to the seat track.

D2. The method of any preceding clause, wherein routing the cable along the length of the raceway comprises bending the cable around guides that are spaced apart along the length of the raceway such that the path of the cable includes bends that are spaced apart along the path of the cable.

D3. The method of any preceding clause, wherein routing the cable along the length of the raceway comprises bending the cable around guides that are spaced apart along the length of the raceway such that the path of the cable comprises at least one of a tortuous, winding, curved, or twisting segment.

D4. The method of any preceding clause, wherein bending the cable around the guide comprises increasing the length of the path of the cable along the length of the base.

D5. The method of any preceding clause, wherein routing the cable along the length of the raceway comprises bending the cable around guides such that the path of the cable along the length of the raceway comprises a group of bends that forms at least one of a U-shape, a W-shape, a V-shape, or an S-curve.

D6. The method of any preceding clause, wherein routing the cable along the length of the raceway comprises bending the cable around the guide such that the path of the cable along the length of the raceway comprises a loop.

D7. The method of any preceding clause, wherein routing the cable along the length of the raceway comprises routing the cable along the raceway in one of first and second geometries, wherein the path of the cable along the length of the raceway has a greater length in the first geometry as compared to the second geometry.

D8. The method of any preceding clause, wherein the guide is a first guide, the method further comprising routing the cable around at least one second guide such that the path of the cable along the length of the raceway is approximately straight.

D9. The method of any preceding clause, wherein routing the cable along the length of the raceway comprises routing the cable through a channel of the guide.

D10. The method of any preceding clause, routing the cable along the length of the raceway comprises routing the cable through a clip of the guide.

D11. The method of any preceding clause, further comprising mounting a cover of the raceway to a base of the raceway.

D12. The method of any preceding clause, further comprising positioning connector housings adjacent end portions of a base of the raceway.

D13. The method of any preceding clause, further comprising mounting end covers of the raceway to a base of the raceway such that the end covers telescope inwardly and outwardly relative to the base.

D14. The method of any preceding clause, wherein bending the cable around the guide comprises increasing the length of the path of the cable along the length of the base by approximately one inch.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one implementation or can relate to several implementations. The implementations are not limited to those that solve any or all of the stated problems or those that have any or all of the stated benefits and advantages. It will further be understood that reference to 'an' item refers to one or more of those items.

The order of execution or performance of the operations in examples of the present application illustrated and described herein is not essential, unless otherwise specified. That is, the operations can be performed in any order, unless otherwise specified, and examples of the application can include additional or fewer operations than those disclosed herein. For example, it is contemplated that executing or performing a particular operation before, contemporaneously with, or after another operation (e.g., different steps, etc.) is within the scope of aspects and implementations of the application.

The term "comprising" is used in this specification to mean including the feature(s) or act(s) followed thereafter, without excluding the presence of one or more additional features or acts. The terms "comprising," "including," and "having" are intended to be inclusive and mean that there can be additional elements other than the listed elements. In other words, the use of "including," "comprising," "having," "containing," "involving," and variations thereof, is meant to encompass the items listed thereafter and additional items. Accordingly, and for example, unless explicitly stated to the contrary, implementations "comprising" or "having" an element or a plurality of elements having a particular property can include additional elements not having that property. Further, references to "one implementation" or "an implementation" are not intended to be interpreted as excluding the existence of additional implementations that also incorporate the recited features. The term "exemplary" is intended to mean "an example of".

When introducing elements of aspects of the application or the examples thereof, the articles "a," "an," "the," and "said" are intended to mean that there are one or more of the elements. In other words, the indefinite articles "a", "an", "the", and "said" as used in the specification and in the claims, unless clearly indicated to the contrary, should be understood to mean "at least one." Accordingly, and for example, as used herein, an element or step recited in the singular and preceded by the word "a" or "an" should be understood as not necessarily excluding the plural of the elements or steps.

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements are optionally present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B): in another implementation, to B only (optionally including elements other than A): in yet another implementation, to both A and B (optionally including other elements): etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either," "one of" "only one of" or "exactly one of." "Consisting essentially of," when used in the claims, shall have its ordinary meaning as used in the field of patent law:

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements to optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B): in another implementation, to at least one, optionally including more than one, B, with no A present (and optionally including elements other than A): in yet another implementation, to at least one, optionally including more than one, A, and at least one, optionally including more than one, B (and optionally including other elements): etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the application in detail, it will be apparent that modifications and variations are possible without departing from the scope of aspects of the application as defined in the appended claims. As various changes could be made in the above constructions, products, and methods without departing from the scope of aspects of the application, it is intended that all matter contained in the above description and shown in the accompanying drawings shall be interpreted as illustrative and not in a limiting sense.

It is to be understood that the above description is intended to be illustrative, and not restrictive. For example, the above-described implementations (and/or aspects thereof) can be used in combination with each other. In addition, many modifications can be made to adapt a particular situation or material to the teachings of the various implementations of the application without departing from their scope. While the dimensions and types of materials described herein are intended to define the parameters of the various implementations of the application, the implementations are by no means limiting and are example implementations. Many other implementations will be apparent to those of ordinary skill in the art upon reviewing the above description. The scope of the various implementations of the application should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the application, including the best mode, and also to enable any person of ordinary skill in the art to practice the various implementations of the application, including making and using any devices or systems and performing any incorporated methods. The patentable scope of the various implementations of the application is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A raceway for containing a cable of an aircraft, the raceway comprising:
an elongate base extending a length between end portions and extending a width between sides, the base being configured to be mounted to a structure of the aircraft, the base comprising a guide that extends outwardly from a face of the base, wherein the guide is arranged along the length and width of the base such that the guide is configured to bend a path of the cable along the length of the base; and
wherein the guide comprises groups of guides spaced apart along the length of the base such that each group of guides is configured to generate a corresponding group of bends, each group of bends configured to increase the length of the path of the cable along the length of the base.

2. The raceway of claim 1, wherein the groups of guides are configured to bend the path of the cable such that the path comprises at least one of a tortuous, winding, curved, or twisting segment.

3. The raceway of claim 1, wherein the groups of guides are configured to generate the group of bends that forms at least one of a U-shape, a W-shape, a V-shape, or an S-curve.

4. The raceway of claim 1, wherein the guide is configured to generate a loop along the path of the cable.

5. The raceway of claim 1, wherein the groups of guides are arranged along the length and width of the base such that the raceway is configured to hold the cable in first and second geometries, wherein the path of the cable along the length of the base has a greater length in the first geometry as compared to the second geometry.

6. The raceway of claim 1, wherein the groups of guides are configured to provide the path of the cable along the length of the base as approximately straight.

7. The raceway of claim 1, wherein the guides comprise opposing towers with a channel defined between the towers, the channel being configured to receive a segment of the cable therein.

8. The raceway of claim 1, wherein the guides comprise a clip configured to hold a segment of the cable along the face of the base.

9. The raceway of claim 1, further comprising:
a cover mounted to the base such that the cover extends over the face of the base;
connector housings extending adjacent the end portions of the base; and
end covers extending over the connector housings and configured to telescope inwardly and outwardly relative to the base.

10. A raceway assembly for an aircraft cabin, the raceway assembly comprising:
a cable; and
an elongate base extending a length between end portions and extending a width between sides, the base being configured to be mounted to a structure of the aircraft, the base comprising a guide that extends outwardly from a face of the base, wherein the guide is arranged along the length and width of the base such that the guide is configured to bend a path of the cable along the length of the base;
wherein the cable is held along the length of the base and the guide is arranged along the length and width of the base such that a path of the cable along the length of the base is bent by the guide; and
wherein the guide comprises groups of guides spaced apart along the length of the base such that each of the group of guides is configured to generate a corresponding group of bends along the path of the cable, each of the group of bends configured to increase the length of the path of the cable along the length of the base by approximately one inch.

11. The raceway assembly of claim 10, wherein the path of the cable comprises at least one of a tortuous, winding, curved, or twisting segment.

12. The raceway assembly of claim 10, wherein the group of guides are arranged relative to each other along the length and width of the base such that the path of the cable comprises at least one of a U-shape, a W-shape, a V-shape, an S-curve, or a loop.

13. The raceway assembly of claim 10, wherein the group of guides is configured to hold the cable in first and second geometries, wherein the path of the cable along the length of the base has a greater length in the first geometry as compared to the second geometry.

14. The raceway assembly of claim 10, wherein the guide is a first guide, the base comprising at least one second guide that is configured to provide the path of the cable along the length of the base as approximately straight.

15. A method of routing a cable to an aircraft seat mounted to a seat track, the method comprising:
routing the cable along a length of a raceway including bending the cable around guides of the raceway such that a path of the cable along the length of the raceway includes a bend;
mounting the base to the seat track; and
wherein routing the cable along the length of the raceway comprises bending the cable around the guides such that the path of the cable along the length of the raceway comprises a group of bends that forms at least one of a U-shape, a W-shape, a V-shape, or an S-curve.

16. The raceway of claim 1, wherein the each of the groups of guides is configured to increase the length of the path of the cable.

17. The raceway of claim 1, wherein each of the groups of guides comprises guides that face in different directions relative to the base.

18. The method of claim 15, further comprising bending the cable around the guides to a radius that is equal to or greater than a minimum bend radius of the cable.

19. The method of claim 15, further comprising bending the cable around multiple groups of the guides.

20. The method of claim 15, further comprising increasing a length of the cable that is positioned along the raceway.

\*    \*    \*    \*    \*